UNITED STATES PATENT OFFICE.

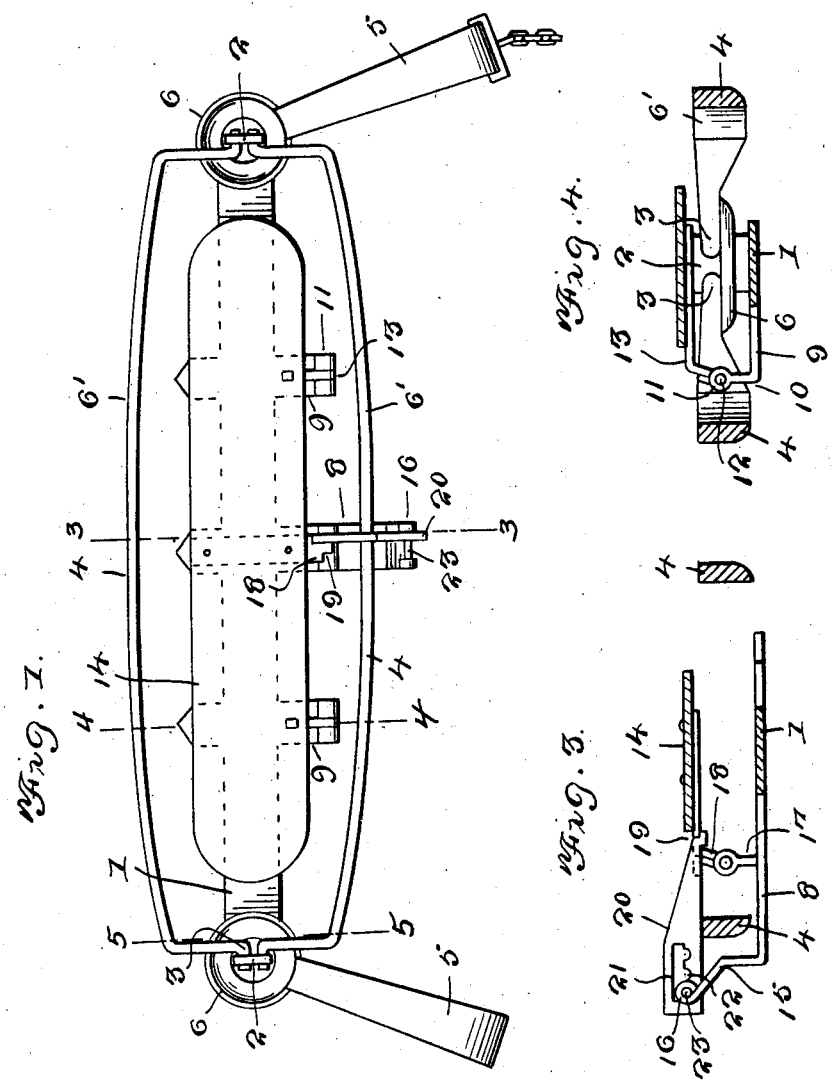

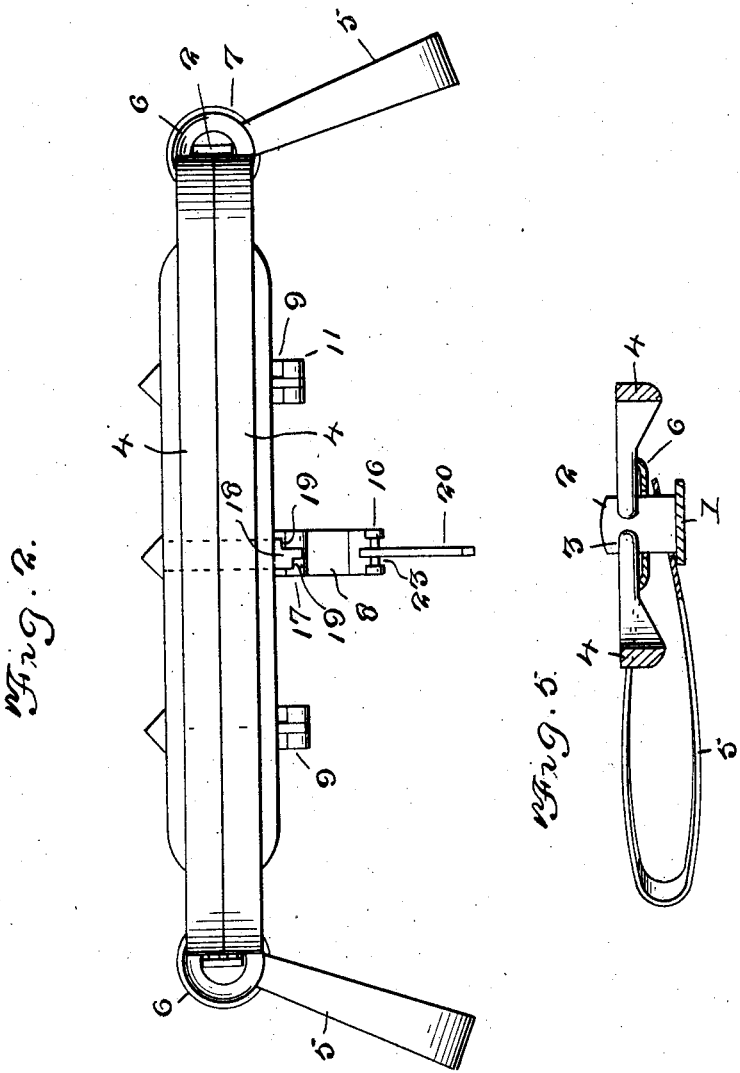

NELS S. NELSON AND AXEL BOODE, OF DETROIT, MICHIGAN.

TRAP.

1,391,570. Specification of Letters Patent. Patented Sept. 20, 1921.

Application filed July 6, 1920. Serial No. 394,160.

*To all whom it may concern:*

Be it known that NELS S. NELSON and AXEL BOODE, subjects of the King of Great Britain, residing at Detroit, in the county of Wayne and State of Michigan, have invented new and useful Improvements in Traps, of which the following is a specification.

This invention relates to animal traps, particularly to those of the spring jaw type, and has for its object the provision of a trap which is provided with features of adjustment so that the delicacy of the trap may be varied so that it may be used for trapping animals of different sizes or weights and which is also adjustable so as to compensate for different weights upon the pan thereof, this latter mentioned feature being important inasmuch as it is always necessary to conceal a trap of this character with leaves, earth, or the like, and also as it frequently occurs that during a snow storm the snow falling upon such a trap and subsequently freezing and crusting, is apt to interfere with the proper action of an ordinary trap.

Another object is the provision of a trap of this character in which the pan is relatively large and which therefore overcomes a very serious objection to the ordinary trap and that is that the pan in the ordinary trap is comparatively small and it is frequent that an animal passes directly over the trap without springing it.

An additional object is the provision of a trap of this character which will be comparatively simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a plan view of the trap in set position,

Fig. 2 is a similar view showing the sprung position,

Fig. 3 is a central cross sectional view taken on the line 3—3 of Fig. 1,

Fig. 4 is a cross sectional view through one of the cross members taken on the line 4—4 of Fig. 1, Fig. 5 is a cross sectional view on the line 5—5 of Fig. 1.

Referring more particularly to the drawings, the numeral 1 designates the base of the trap which has its ends upturned, as shown at 2, and provided with spaced openings receiving offset portions 3 on the ends of the jaws 4. The usual double-leaf springs 5 are employed for springing the jaws to closed position, as illustrated in Fig. 3, and each of these springs has its upper leaf enlarged to define a circular head 6 which is concaved or dished, as clearly shown. The base 1 is of materially greater length than the base of an ordinary trap and the jaws 4 have their side or gripping portions 6' arched or curved outwardly from their angle ends to their centers. This construction strengthens the jaws throughout the length thereof, the maximum strength being at the center of the jaws at or adjacent which the leg of the animal trapped is most likely to be engaged. The jaws are approximately eighteen inches in length, such length being most desirable when the trap is employed for catching wolves, coyotes, and foxes, for which animals the trap is primarily devised. It will thus be noted that the jaws are of a far greater length than the jaws employed in any ordinary trap construction.

On the base 1 there are formed or secured three cross pieces, one being arranged at the center of the base and indicated by the numeral 8 and the others, indicated by the numeral 9 being arranged a suitable distance to the sides of the cross piece 8. All of these pieces are of greater length than the width of the base and the central cross piece 8 is considerably longer than the cross pieces 9. The free ends of the cross pieces 9 are upturned, as shown at 10 and formed to provide eyes 11 which are slotted and disposed within these slots and pivoted therein, as shown at 12, are arms 13 which support the trip pan 14 which is of somewhat less length than the jaws, being in actual practice about fifteen inches long, that is a length which will practically insure that the animal to be trapped will step upon the trip pan in his natural stride.

The central cross piece 8 has its free end upturned, as shown at 15, with its terminal formed into an eye 16 and slotted. Rising from the cross piece 8 beyond the adjacent side of the trip pan 14, is a post 17 upon which is pivoted an arm 18 secured to the trip pan and this arm is cut away at two points to define a plurality of shoulders 19.

Associated with the cross piece 8 is a dog 20 having its outer end formed with an elongated slot 21 at the bottom of which is formed a plurality of notches 22, any selected one of which may be engaged upon the transverse pivot pin 23 extending through the eye 16, it being noted that this eye is slotted with the slot a great deal wider than the thickness of the dog, as clearly shown in Figs. 1 and 3. The other end of this dog is adapted for engagement beneath either of the shoulders 19, as the case may be, the notches 22 being so arranged as to have the proper relation to the shoulders 19 so that when the dog is moved longitudinally to bring a certain notch in engagement with the pin 23, the free end of the dog will be engaged beneath the corresponding shoulder. Owing to the fact that the slot in the eye 16 is so much wider than the thickness of the dog, it is seen that the dog may be moved laterally with the slot so that its free end may engage the different shoulders.

Owing to the fact that the upper leaves of the spring 5 which engage the angular ends 7 of the jaws are widened and dished, it will be seen that the angular ends of the jaws will contact only with the front edges of these dished portions 6 and as a consequence a quicker action by the springs upon the jaws is obtained. The trap is of course set by forcing the jaws downwardly and apart, against the resistance of the springs 5 and then adjusting the dog 20 so that it will be engaged beneath the desired shoulder 19. After the trap has been thus set it will be readily apparent that an animal stepping upon the trip pan 14 will cause the dog to drop as the weight upon the pan will relieve the spring pressure upon the dog. The dog thus tripping, it will be seen that the jaws 4 will spring upwardly and engage the animal by the leg. In trapping animals such as wolves, coyotes, and foxes, the trap is set across the trail, but by setting the trap at one side of the trail, other animals such as beaver, coon, and the like, which travel with a waddling gait, may be equally easily trapped.

In the setting of the trap it will be observed that when the dog is moved outwardly away from the base or the pan as far as possible and engaged with the outermost shoulder 19, a lighter weight will be required to trip the trap than when the dog is adjusted to be engaged with either one of the other shoulders. Owing to this feature it will be readily apparent that the trap may be used for catching small animals as well as large ones for which it is primarily intended. This feature also permits the trapper to exercise his judgment as to the adjustment necessary.

It will be observed that there is another very important function of the dished upper leaves of the springs in addition to their function in effecting quick action, as previously described. This additional feature is that owing to the fact that only the edges of the dished portions engage the jaws and as these edges are considerably outwardly of the pivot points of the jaws, a much greater leverage will be exerted by the springs on the jaws. This feature takes on added importance when it is considered that in the actual use of the trap it must be covered with leaves, loose earth, or snow in order to make it effective. In the case of covering with snow it frequently occurs that the snow freezes and becomes crusted and this added leverage provided by dishing the springs insures that the trap will spring and lift the weight of the covering matter with sufficient rapidity to trap the animal stepping upon the pan.

From the foregoing description and a study of the drawings it will be apparent that there has thus been provided a simply constructed and easily set trap which is readily adjustable for use in trapping animals of different sizes and weights and it will also be apparent that sensitiveness is present to a marked degree when proper adjustment is made.

While we have shown and described the preferred embodiment of our invention, it is of course to be understood that we reserve the right to make such changes in the form, construction, and arrangement of parts as will not depart from the spirit of the invention or the scope of the subjoined claims.

Having thus described our invention, we claim:

1. A trap of the character described comprising a base having upturned ends, jaws having offset ends pivoted within said upturned ends of the base, U-springs between the base and the ends of the jaws for normally swinging the jaws closed, a plurality of cross pieces on the base extending laterally with respect thereto and beyond the edge thereof, a trip pan, arms carried by said trip pan and hingedly connected with the outer cross pieces, the intermediate cross piece extending outwardly beyond the outer cross pieces and having its free end upturned and slotted, an arm carried by said trip pan above said intermediate cross piece and cut away to provide a plurality of shoulders disposed at different distances from the edge of the pan, and a dog disposed within said notch and longitudinally adustable and laterally movable whereby its free end will be engaged with a selected one of said shoulders.

2. A trap of the character described comprising a base having upturned ends, jaws having offset ends pivoted within said upturned ends of the base, U-springs between the base and the ends of the jaws for normally swinging the jaws closed, a plurality of cross pieces on the base extending laterally with respect thereto and beyond the edge thereof, a trip pan, arms carried by said trip pan and hingedly connected with the outer cross pieces, the intermediate cross piece extending outwardly beyond the outer cross pieces and having its free end upturned and slotted, an arm carried by said trip pan above said intermediate cross piece and cut away to provide a plurality of shoulders disposed at different distances from the edge of the pan, and a dog disposed within said notch and longitudinally adjustable and laterally movable whereby its free end will be engaged with a selected one of said shoulders, the outer end of the dog being formed with a longitudinal slot having its bottom formed with spaced notches, and a transverse pivot pin carried by the upturned end of the intermediate cross piece and extending transversely of the slot therein and engageable by a selected one of said notches.

In testimony whereof we affix our signatures.

NELS S. NELSON.
AXEL BOODE.